(12) United States Patent
Meyer et al.

(10) Patent No.: US 9,371,437 B2
(45) Date of Patent: Jun. 21, 2016

(54) POLYCARBONATE PLATES WITH IMPROVED FLAME RESISTANCE

(75) Inventors: Alexander Meyer, Düsseldorf (DE); Berit Krauter, Opladen (DE); Claus Rüdiger, Krefeld (DE); Ulrich Blaschke, Krefeld (DE); Peter Schwarz, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 94 days.

(21) Appl. No.: 13/505,014

(22) PCT Filed: Nov. 3, 2010

(86) PCT No.: PCT/EP2010/066731
§ 371 (c)(1),
(2), (4) Date: Apr. 30, 2012

(87) PCT Pub. No.: WO2011/054862
PCT Pub. Date: May 12, 2011

(65) Prior Publication Data
US 2012/0213982 A1 Aug. 23, 2012

(30) Foreign Application Priority Data
Nov. 5, 2009 (DE) .................. 10 2009 052 043

(51) Int. Cl.
| | |
|---|---|
| B32B 5/00 | (2006.01) |
| C09D 169/00 | (2006.01) |
| C08L 69/00 | (2006.01) |
| C08K 5/521 | (2006.01) |
| B32B 27/28 | (2006.01) |
| B32B 27/06 | (2006.01) |
| C08K 5/49 | (2006.01) |
| C08K 5/523 | (2006.01) |

(52) U.S. Cl.
CPC . *C08K 5/49* (2013.01); *C08K 5/523* (2013.01); *Y10T 428/31507* (2015.04)

(58) Field of Classification Search
USPC ............. 428/219, 412, 220; 524/127
See application file for complete search history.

(56) References Cited

U.S. PATENT DOCUMENTS

| | | | |
|---|---|---|---|
| 4,707,393 A | 11/1987 | Vetter | |
| 5,061,558 A | 10/1991 | Fischer et al. | |
| 5,063,112 A | 11/1991 | Gross et al. | |
| 5,672,645 A | 9/1997 | Eckel et al. | |
| 5,846,659 A | 12/1998 | Lower et al. | |
| 6,462,111 B1 * | 10/2002 | Singh et al. | 524/108 |
| 6,649,677 B2 | 11/2003 | Jaatinen et al. | |
| 6,969,745 B1 * | 11/2005 | Taraiya et al. | 525/439 |
| 7,303,810 B2 | 12/2007 | Goodson et al. | |
| 2002/0038044 A1 | 3/2002 | Janke et al. | |
| 2003/0069338 A1 | 4/2003 | Goossens et al. | |
| 2003/0083408 A1 * | 5/2003 | Bienmuller et al. | 524/115 |
| 2003/0091814 A1 | 5/2003 | Benz et al. | |
| 2003/0149145 A1 | 8/2003 | Bienmuller et al. | |
| 2005/0112331 A1 * | 5/2005 | Donea et al. | 428/166 |
| 2005/0142371 A1 | 6/2005 | Swain et al. | |
| 2006/0128851 A1 * | 6/2006 | Fishburn et al. | 524/195 |
| 2006/0240242 A1 | 10/2006 | Raghavendran et al. | |
| 2011/0112226 A1 | 5/2011 | Rudiger et al. | |

FOREIGN PATENT DOCUMENTS

| | | |
|---|---|---|
| CA | 1238164 A1 | 6/1988 |
| DE | 10 31 512 B | 6/1958 |
| DE | 4 238 123 A1 | 5/1994 |
| DE | 10160138 A1 | 6/2003 |
| EP | 0 110 238 A2 | 6/1984 |
| EP | 0110221 A2 | 6/1984 |
| EP | 0120394 A1 | 10/1984 |
| EP | 368094 A1 | 5/1990 |
| EP | 372213 A1 | 6/1990 |
| EP | 0548822 A2 | 6/1993 |
| EP | 0 640 655 A2 | 3/1995 |
| EP | 0700969 A1 | 3/1996 |
| EP | 700969 A1 * | 3/1996 |
| EP | 0 716 919 A2 | 6/1996 |
| EP | 0767204 A2 | 4/1997 |
| EP | 1308084 A1 | 5/2003 |
| JP | 62199654 A | 9/1987 |
| JP | 2006335893 A | 12/2006 |
| JP | 2007031583 A | 2/2007 |
| JP | 2008222813 A | 9/2008 |
| WO | WO-99/55772 A1 | 11/1999 |
| WO | WO-00/77012 A1 | 12/2000 |
| WO | WO-01/83606 A1 | 11/2001 |
| WO | WO-03002643 A1 | 1/2003 |
| WO | WO-2007/064322 A1 | 6/2007 |
| WO | WO-2008/125203 A1 | 10/2008 |

OTHER PUBLICATIONS

International Search Report for PCT/EP2010/066731 mailed Mar. 18, 2011.

\* cited by examiner

*Primary Examiner* — Tahseen N Khan
(74) *Attorney, Agent, or Firm* — Drinker Biddle & Reath LLP

(57) ABSTRACT

A sheet containing a base layer containing polycarbonate and a flame retardant, wherein the flame retardant contains a compound of formula 1

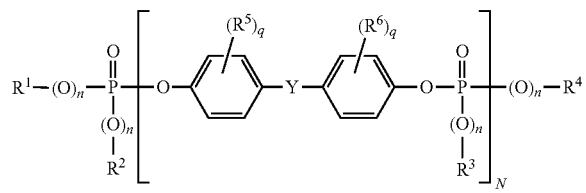

(1)

wherein
$R^1$, $R^2$, $R^3$ and $R^4$, represents an optionally halogen-substituted $C_1$-$C_8$ alkyl, $C_5$-$C_6$ cycloalkyl, $C_6$-$C_{10}$ aryl or $C_7$-$C_{12}$ aralkyl, $R^5$ and $R^6$, represents a $C_1$-$C_4$ alkyl, and Y represents a $C_1$-$C_7$ alkylidene, $C_1$-$C_7$ alkylene, $C_5$-$C_{12}$ cycloalkylidene, —O—, —S—, —SO—, —SO$_2$—, —CO— or a residue of formula (2) or (3)

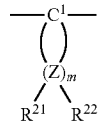

(2)

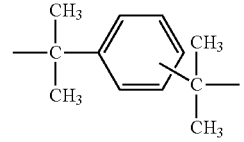

(3)

wherein Z represents carbon and $R^{21}$ and $R^{22}$ can be selected for each Z individually and, represent hydrogen or C1-C6 alkyl, with the proviso that, on at least one Z atom, $R^{21}$ and $R^{22}$ are simultaneously alkyl and wherein the polycarbonate comprises a mixture of linear and branched polycarbonate and wherein the linear polycarbonate content is at least 40 wt. %, based on the total polycarbonate weight.

18 Claims, 1 Drawing Sheet

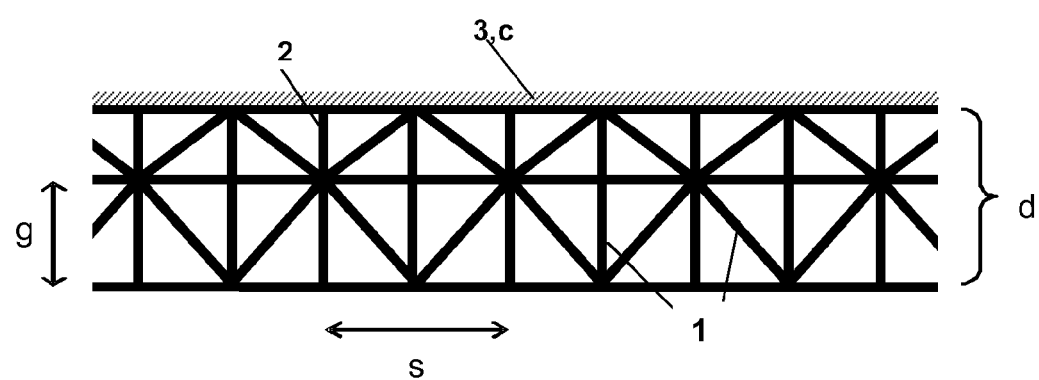

POLYCARBONATE PLATES WITH IMPROVED FLAME RESISTANCE

CROSS-REFERENCE TO RELATED APPLICATIONS

This application is a national stage application (under 35 U.S.C. 0371) of PCT/EP2010/066731, filed Nov. 3, 2010, which claims benefit of German application 10 2009 052 043.0, filed Nov. 5, 2009, both of which are incorporated herein by reference in their entirety for all their useful purposes.

The present invention relates to flame-resistant sheets of polycarbonate, which are distinguished by the fact that they maintain their flame retardant properties even after a prolonged period of outdoor weathering.

Flameproofed plastics moulding compounds are used for a large number of applications. Typical areas of application for these plastics are electrical engineering and electronics, where they are used, inter alia, for the production of supports for voltage-carrying parts or in the form of television and monitor housings. However, flameproofed plastics have also become well established in the area of interior trim for rail vehicles or aircraft. Here, in addition to good flame retardant properties, the plastics used must also display other positive properties to a high level. These include, inter alia, mechanical properties, such as, for example, high impact resistance and adequate long-term stability in relation to thermal stress or possible damage through the action of light. This combination of properties is not always easy to achieve. While it is true that plastics can generally be provided with the desired flame resistance with the aid of flame retardants, however, relatively large quantities are often needed for this purpose, which rapidly leads to a drastic deterioration of other properties, such as e.g. mechanical properties. Other additives, such as e.g. colorants, fillers and pigments, can also lead to a deterioration in flame retardant properties.

Apart from the influence of the basic material, such as e.g. the polycarbonate, and the influence of the above-mentioned additives, another factor determining the flame retardant properties is the shape or nature of the particular finished part. It can be significant whether the end product is an extrudate or an injection moulding. The shape and size also determine the fire properties. Thus, whether an article is of a more compact, geometrically complex, light or heavy configuration plays a part. Thus, rapid extinguishing or drip behaviour in the event of fire are influenced by the construction of the particular article. The present invention relates to polycarbonate sheets in a solid configuration or as single- or multi-wall sheets. In general, different tests from those used in the injection moulding sector are of relevance to these sheets, which are used primarily in the building and construction sector. These tests, such as e.g. classification in the fire shaft test according to DIN 4102, are decisive in the building and construction sector for the respective area of application of the sheet. In the present invention, therefore, special emphasis is placed on the fire shaft test as an important test which is decisive for the construction and building sector. Other tests, such as e.g. the UL test, which is significant for example for applications in the electrical and electronics sector and in information technology, describe inter alia the drip behaviour of an article, often from the injection-moulding sector, and are not significant or are of only secondary importance for the building and construction sector.

Mouldings of bisphenol A polycarbonate are flame resistant and can already achieve the classification V 2 according to "Underwriters Laboratories Subject 94" (UL) without any special flame-retardant additives. With flame-retardant additives or halogen additives or anti-drip agents, the classification V0 according to UL Subject 94 is achieved.

As described above, however, in particular for extruded articles for use in the building sector, special tests are required. The standard DIN 4102, which is compulsory for the Federal Republic of Germany, divides building materials into the following classes according to their fire behaviour: building material class A non-combustible, building material class B1 flame-resistant, building material class B2 normally inflammable, building material class B3 highly inflammable. Combustible building materials are categorised in class B1 if they pass the test in the fire shaft according to DIN 4102.

Many polycarbonate sheets are used in the outdoor sector and, according to the requirements, initially meet the fire protection standard specified in the particular case. Solid sheets up to 4 mm thickness or multi-wall sheets and profiles of bisphenol A polycarbonate can, in some cases, achieve a B1 in the fire shaft test even without the use of flame retardants. It has been shown, however, that these sheets, which are exposed to the particular outdoor conditions, change their flame-retardant properties over time so that in many cases a B1 classification can no longer be achieved. This has been described e.g. in EP-A 0120394. It is important that the sheets do not change their flame retardant properties, or do so only to an insignificant degree, even after a prolonged period of outdoor weathering. Thus, even after a certain period of outdoor weathering, the fire shaft test should be passed with the same fire result as in the case of the freshly manufactured sheet. For this reason, for the grant of a fire class according to DIN 4102, outdoor weathering of the type of sheet being evaluated is also required. Only if, after this period, the fire result is unchanged in relation to the initial test will the corresponding fire certificate be granted by the Deutsches Institut für Bautechnik (DIBt). Maintaining the flame-retardant properties is therefore very important; in the past, however, little attention has been paid to this issue and it has not been investigated further and therefore often not even described further in publications.

Halogen-containing flame retardants have often proved suitable for use in polycarbonate sheets and are regularly superior to phosphorus-containing flame retardants. This is described e.g. in JP-A 62199654. Here, tetrabromobisphenol A oligomers are used. Examples of these brominated compounds, such as brominated oligocarbonates, are e.g. tetrabromobisphenol A oligocarbonate BC-52®, BC-58®, BC-52HP® from Chemtura. In addition, polypentabromobenzyl acrylates (e.g. FR 1025 from Dead Sea Bromine (DSB)), oligomeric reaction products of tetrabromobisphenol A with expoxides (e.g. FR 2300® and 2400® from DSB), or brominated oligo- and polystyrenes (e.g. Pyro-Chek® 68PB from Ferro Corporation, PDBS 80® and Firemaster® PBS-64HW from Chemtura), should be mentioned.

However, even sheets that contain these normally superior, halogen-containing flame retardants lose their initially good flame-resistant properties after weathering.

The starting point of the present invention was therefore the object of providing sheets of polycarbonate for the building and construction sector, which retain their classification in the fire shaft test, or do not change it significantly, even after prolonged outdoor weathering.

For polycarbonate, a large number of flame retardants are used. These can be both halogen-containing products and halogen-free additives. As additives, it is also possible to use salts, which often contain fluorine. From the large number of additives it is not clear to the person skilled in the art which additive or mixture of additives effectively maintains fire retardancy even after a prolonged period of outdoor weathering. It should also be borne in mind that certain flame retardants cannot be used in the construction or building sector, or can only be used there on a very minor scale, owing to their high costs. Thus, for example, the use of fluorinated inorganic salts, such as e.g. perfluoroalkane sulfonic acid salts, is associated with high costs. These additives are therefore hardly used in the above market segment. The cost aspect is therefore also an essential criterion for the economic exploitation of the technical solution.

It is known that polycarbonate sheets change their flame retardant properties after a certain period of outdoor weathering. EP-A 0120394, for example, describes polycarbonate compositions with aromatic polyesters, which exhibit improved flame resistance in sheets after outdoor weathering. However, aromatic polyesters based on terephthalic acid and aliphatic diols often affect the optical properties, such as e.g. the transmission, when used in polycarbonate. Furthermore, these sheets can change their optical properties during outdoor weathering, in particular in terms of yellowing. Moreover, these mixtures may tend towards transesterification at high processing temperatures. For these reasons, it is desirable to use sheets without any, or with only a small, addition of polyester. For the present invention, the use of polyesters is unnecessary.

In this connection, US-A 2003/0069338 discloses flameproofed moulding compositions which contain synergistic combinations of cyanoacrylates and flame retardants. The moulding compositions containing these additives are distinguished by improved flame resistance and improved weathering resistance. The compositions mentioned in US-A 2003/0069338 comprise, inter alia, perfluorinated salts, silicones and certain UV absorbers. These ingredients are of only limited suitability for the commercial use of the sheets in the construction and building sector owing to their high price. The same applies to WO 01/83606, in which perfluorosulfonates and cyclic siloxanes are proposed as flame retardants for polycarbonate. Furthermore, the expression weathering resistance relates in US-A 2003/0069338 to protection from yellowing and not to maintaining the flame retardant properties.

JP-A 2007031583, JP-A 2006335893, JP-A 2007191499 and JP-A 2008222813 also describe sheets of polycarbonate containing silicones and/or fluorinated components as flame retardants, which are disadvantageous for the said area of application for the reasons described above.

U.S. Pat. No. 7,303,810 describes polycarbonate/polyester sheets or mixtures thereof, which are flameproofed. The sheets described in U.S. Pat. No. 7,303,810 contain phosphorus-based flame retardant additives. In this application too, however, the fire properties after outdoor weathering are not investigated and therefore these are not dealt with any further. The person skilled in the art cannot therefore tell, from the stated concentrations of the additives used, which ones provide adequate fire protection after outdoor weathering. However, the polycarbonate sheets described in U.S. Pat. No. 7,303,810 have unacceptably low Vicat temperatures, which are a measure of heat resistance, for outdoor applications in building and construction. This is caused by the high concentrations of flame retardants needed, which drastically reduce the Vicat temperature of polycarbonate.

U.S. Pat. No. 6,649,677 discloses that the flame resistance of polycarbonate in the unweathered state can be improved by a significant reduction in the viscosity of the polycarbonate and the addition of very specific amounts of phosphorus flame retardants. The reduction in viscosity leads to a deterioration in the mechanical properties, however, and is therefore not always a suitable method of adjusting the flame retardant properties. In addition, the flame retardant of general formula 1 used in the invention disclosed here is not mentioned in U.S. Pat. No. 6,649,677.

US-A 2006/0240242 discloses sheets with a porous structure consisting of a thermoplastic polymer containing 20-80% reinforcing fibres and flame retardants. The properties after outdoor weathering of these sheets were not optimised, however, and neither the application in general nor the exemplary embodiments in particular focus on polycarbonate or the flame retardants of general formula 1 used here. For the problem of improving the flame resistance of polycarbonate sheets after weathering on which the present invention is based, no teaching can therefore be taken from the application.

WO 2007/064322 A1 describes weather-resistant, flameproofed sheets for roof applications. These roof sheets have a special multi-layer construction, containing inter alia a colouring mid-layer. The flame retardant additive used in the present invention is not described.

WO 2000/077012 A1 describes the use and synthesis of bisphenol A diphenyl phosphates as flame retardants. However, the person skilled in the art cannot derive from this document which compositions are useful in sheets for the building and construction sector for achieving good flame retardant properties even after prolonged outdoor weathering.

In WO 2008/125203 A1, flameproofed plastics compositions are disclosed, which contain a special triazine and 0.01-30% of a flame retardant additive. The triazine is used there in a synergistic mixture with the flame retardant additive, the use of many different types of flame retardants being possible. The person skilled in the art cannot therefore derive from WO 2008/125203 A1 that the flame retardant additive according to the invention used in the present application in certain concentration ranges already effectively protects the polycarbonate sheet from loss of flame retardant properties during outdoor weathering without the synergistic interaction with a UV absorber. In the present application document, the flame retardants of general formula 1 are not used in a mixture with triazines. The flame retardants are used in the base layer of the sheet, and triazines may optionally be used in a coex layer.

In US-A 2005/0142371, sheets of polycarbonate are described which may optionally contain flame retardants. In this application document, a large number of possible flame retardants are mentioned, including phosphorus- and bromine-containing flame retardants. The person skilled in the art cannot tell from there which of these flame retardants leads to improved flame retardant properties after outdoor weathering.

In EP-A 0767204, polycarbonate mixtures containing phosphorus-containing flame retardants are described. No sheets are described. It cannot be derived from the application document how the particular properties of extruded mouldings described above can be achieved.

In WO 2003002643 A1 and DE-A 10160138, polyesters containing phosphorus-containing flame retardants are described. However, these applications disclose no solution for polycarbonate sheets in relation to improved flame retardant properties after outdoor weathering.

The prior art therefore makes no contribution to achieving the object of the present invention, of providing sheets of polycarbonate having improved flame retardant properties after outdoor weathering.

It has now been found that these requirements are met by sheets, the base layer of which contains polycarbonate and 0.05 wt. % to 6.00 wt. %, preferably 0.10 wt. % to 5.50 wt. %, particularly preferably 0.15 wt. % to 5.00 wt. %, most particularly preferably 0.60 wt. % to 5.00% and, in a special embodiment of the invention for sheets with further optimised maximum average flue gas temperatures in the fire shaft test according to DIN 4102-B1 after one year's weathering, 1.50 wt. % to 6.00 wt. %, preferably 2.00 wt. % to 5.00 wt. % and particularly preferably 2.50 wt. % to 5.00 wt. % flame retardants selected from an oligomeric phosphoric acid ester derived from bisphenol A or hydroquinone or resorcinol, particularly preferably from bisphenol A derivatives of formula 1 (flame retardant 1), wherein the wt. % data relate to the overall composition of the base layer. Polycarbonates that are included are both linear and/or branched aromatic polycarbonate, preferably linear polycarbonate or mixtures of branched polycarbonate and linear polycarbonate, wherein the linear polycarbonate content is at least 40 wt. %. In a special embodiment of the invention, the content of linear polycarbonate is greater than 60.00 wt. %. If mixtures of linear and branched polycarbonate are used, preferably mixtures containing 5.00 wt. %-60.00 wt. %, particularly preferably 15.00 wt. %-50.00 wt. % and in a special embodiment of the invention, for sheets with further optimised maximum average flue gas temperatures in the fire shaft test according to DIN 4102-B1 after one year's weathering, 15.00 wt. %-45.00 wt. %, preferably 15.00 wt. %-40.00 wt. % branched polycarbonate are used. The wt. % data again relate to the overall composition of the base layer.

By means of the present invention, polycarbonate sheets are provided which, even after at least 1 year's outdoor weathering, meet the fire classification B1 which they held initially. Furthermore, the sheets have good optical properties, such as high transmission, as well as high heat resistance and good mechanical properties.

The sheets described in the present invention document are protected from yellowing by a layer containing selected UV absorbers. However, this UV protection does not prevent a change in the flame retardant properties. Only sheets having the construction according to the invention therefore display the advantageous flame retardant properties described after weathering.

Within the framework of the present invention, it has now been found that, in polycarbonate sheets containing concentrations of special phosphorus-containing flame retardants according to the invention, the flame retardant properties after outdoor weathering are surprisingly significantly improved in comparison to the prior art.

The phosphorus-based flame retardants contained in the composition according to the invention preferably consist of oligomeric phosphoric acid esters, which are derived from the following formula (1):

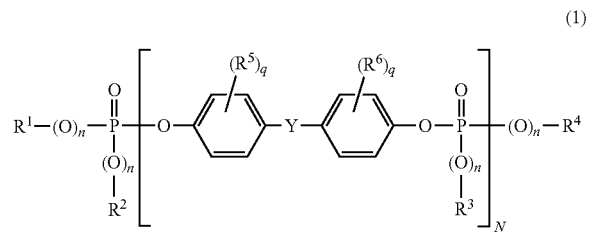

wherein
$R^1$, $R^2$, $R^3$ and $R^4$, independently of one another, signify each optionally halogen-substituted $C_1$-$C_8$ alkyl or, each optionally halogen- and/or alkyl-substituted, $C_5$-$C_6$ cycloalkyl, $C_6$-$C_{10}$ aryl or $C_7$-$C_{12}$ aralkyl,
n independently of one another signifies 0 or 1,
q independently of one another signifies 0, 1, 2, 3 or 4, and
N is 0.60 to 4.00, preferably 0.90 to 2.50, in particular 1.00 to 1.15,
$R^5$ and $R^6$, independently of one another, signify $C_1$-$C_4$ alkyl, preferably methyl, or halogen, preferably chlorine and/or bromine, and
Y signifies $C_1$-$C_7$ alkylidene, $C_1$-$C_7$ alkylene, $C_5$-$C_{12}$ cycloalkylene, $C_5$-$C_{12}$ cycloalkylidene, —O—, —S—, SO—, —SO$_2$—, —CO— or a residue of formula (2) or (3)

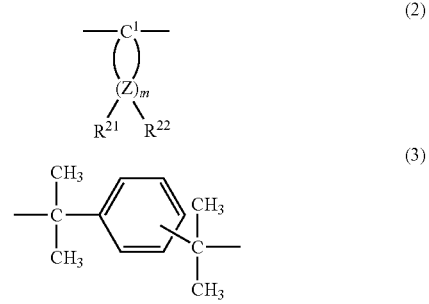

with
Z=carbon and
$R^{21}$ and $R^{22}$ can be selected for each Z individually and, independently of one another, signify hydrogen or C1-C6 alkyl, preferably hydrogen, methyl or ethyl, and
m is an integer from 4 to 7, preferably 4 or 5,
with the proviso that, on at least one Z atom, $R^{21}$ and $R^{22}$ are simultaneously alkyl.

The phosphorus compounds according to flame retardant 1 that are suitable according to the invention are generally known (cf. for example Ullmanns Encyklopädie der Technischen Chemie, vol. 18, pp. 301 ff. 1979; Houben-Weyl, Methoden der Organischen Chemie, vol. 12/1, p. 43; Beistein, vol. 6, p. 177).

Preferred substituents $R^1$ to $R^4$ comprise methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ can be substituted with halogen and/or $C_1$-$C_4$ alkyl. Particularly preferred aryl residues are cresyl, phenyl, xylenyl, propyl phenyl or butyl phenyl as well as the brominated and chlorinated derivatives thereof.

$R^5$ and $R^6$, independently of one another, preferably signify methyl or bromine.

Y preferably denotes $C_1$-$C_7$ alkylene, particularly isopropylidene or methylene, most particularly preferably isopropylidene.

n in formula (1), independently of one another, can be 0 or 1, with n preferably equal to 1.

q can be 0, 1, 2, 3 or 4, with q preferably being 0, 1 or 2.

N can assume values of 0.50 to 4.00, preferably 0.90 to 2.50, in particular 1.00 to 1.15. As flame retardant 1 according to the invention, it is also possible to use mixtures of different phosphates. In this case, N is an average value. Monophosphorus compounds (N=0) can also be contained in this mixture.

The content of the monophosphorus compounds (N=0) in the flame retardant 1 is preferably less than or equal to 5.00 wt. %, preferably less than or equal to 4.00 wt. %, particularly preferably less than or equal to 3.00 wt. %.

The average N values can be determined by determining the composition of the phosphate mixture (molecular weight distribution) by a suitable method (gas chromatography (GC), high pressure liquid chromatography (HPLC), gel permeation chromatography (GPC)) and calculating the average values for N therefrom.

Bisphenol A diphosphate is particularly preferred within the framework of the present invention. Bisphenol A diphosphate is commercially available inter alia as Reofos® BAPP (Chemtura, Indianapolis, USA), NcendX® P-30 (Albemarle, Baton Rouge, La., USA), Fyrolflex® BDP (Akzo Nobel, Arnheim, Netherlands) or CR 741® (Daihachi, Osaka, Japan).

The production of these flame retardants is also described e.g. in US-A 2002/0038044.

The sheets according to the invention can be used advantageously in various applications. The sheets according to the invention are especially suitable for use in architectural or industrial glazings, such as e.g. wall and roof claddings, skylight domes or shatterproof glazing, which are subject to increased demands in relation to flame resistance after weathering. These sheets can be produced in particular by extrusion. They can be solid sheets in a thickness of, for example, 1 to 10 mm or multi-wall sheets or hollow profiles, in some cases with special geometry. The sheets according to the invention are preferably used in the outdoor sector.

In contrast to sheets with other flame retardants commonly used in polycarbonates, the sheets according to the invention surprisingly meet the B1 standard even after a prolonged period of weathering.

In particular, sheets with a weight per unit area of greater than or equal to 2.4 kg/m², greater than or equal to 2.5 kg/m² and/or greater than or equal to 2.7 kg/m² can be produced with the composition according to the invention. Other preferred weights per unit area of the sheets are greater than or equal to 2.8 kg/m², greater than or equal to 3.1 kg/m² and/or greater than or equal to 3.4 kg/m². In other embodiments, preferred sheets are those with a weight per unit area of greater than or equal to 3.5 kg/m² and/or greater than or equal to 3.7 kg/m² and sheets with a weight per unit area of greater than or equal to 4.2 kg/m². These can be solid or multi-wall sheets. One example of a multi-wall sheet (three-wall sheet with an X profile) additionally containing a coextrusion layer (3) is illustrated in FIG. 1. The multi-wall sheet consists of ribs (1) and walls (2), with the upper and lower walls forming the outer layers in each case. If the ribs do not all run parallel to one another, perpendicular to the walls, but cross at an internal wall, the profile is known as an X profile. The spacing between two parallel ribs at the external walls is s, the spacing between the walls (2) is labelled g. The overall thickness of the sheet from outer wall to outer wall is labelled d, and the thickness of the coextrusion layer (3) is labelled c.

The base layer of the sheets according to the invention can have the following geometries, for example:
- 3-wall sheet with a thickness d of 12 to 20 mm and a rib spacing s of 12 to 20 mm
- 6-wall sheet with a thickness d of 12 to 22 mm and a rib spacing s of 12 to 22 mm
- 3-wall sheet with an X profile and a thickness d of 12 to 20 mm wherein the X structure (formed by 3 ribs) has a width s of 20 to 30 mm.
- 5-wall sheet with an X profile and a thickness of 20 to 50 mm wherein the X structure (formed by 3 ribs) has a width s of 20 to 30 mm.
- 5-wall sheet with an M profile and a thickness of 20 to 50 mm, wherein the ribs have a spacing of 15 to 25 mm.

The sheets according to the invention preferably consist of the base layer, which is provided on one or both sides with a covering layer.

Polycarbonates for the base and covering layers of the sheets according to the invention are homopolycarbonates, copolycarbonates and thermoplastic polyester carbonates. Aromatic linear and/or branched aromatic polycarbonate is preferred, preferably linear polycarbonate or mixtures of branched polycarbonate and linear polycarbonate, wherein the linear polycarbonate content is at least 40.00 wt. %. In a special embodiment of the invention, the content of linear polycarbonate is greater than 60.00 wt. %. If mixtures of linear and branched polycarbonate are used, preferably mixtures containing 5.00 wt. %-60.00 wt. %, particularly preferably 15.00 wt. %-50.00 wt. % and, in a special embodiment of the invention for sheets with further optimised maximum average flue gas temperatures in the fire shaft test according to DIN 4102-B1 after one year's weathering, 15.00 wt. %-45.00 wt. %, preferably 15.00 wt. %-40.00 wt. % branched polycarbonate are used. The wt. % data here relate to the overall composition of the respective layer.

The polycarbonate or mixture of polycarbonates used preferably has an MVR<11 (at 300° C. and 1.2 kg according to ISO 1133) and most particularly preferably an MVR<8 (at 300° C. and 1.2 kg according to ISO 1133).

The linear or branched polycarbonates and copolycarbonates to be used in the sheets according to the invention generally have average molecular weights $\overline{M}_w$ (weight average) of 2 000 to 200 000 g/mol, preferably 3 000 to 150 000 g/mol, in particular 5 000 to 100 000 g/mol, most particularly preferably 8 000 to 80 000 g/mol, in particular 12 000 to 70 000 g/mol (determined by gel permeation chromatography with polycarbonate calibration).

In this context, they preferably also have average molecular weights with a weight average $\overline{M}_w$ of 16,000 to 40,000 g/mol.

For the production of polycarbonates for the sheets according to the invention, reference is made by way of example to "Schnell", Chemistry and Physics of Polycarbonates, Polymer Reviews, Vol. 9, Interscience Publishers, New York, London, Sydney 1964, to D.C. PREVORSEK, B. T. DEBONA and Y. KESTEN, Corporate Research Center, Allied Chemical Corporation, Moristown, N.J. 07960, "Synthesis of poly (ester)carbonate Copolymers" in Journal of Polymer Science, Polymer Chemistry Edition, Vol. 19, 75-90 (1980), to D. Freitag, U. Grigo, P. R. Müller, N. Nouvertne, BAYER AG, "Polycarbonates" in Encyclopedia of Polymer Science and Engineering, Vol. 11, Second Edition, 1988, pages 648-718 and finally to Drs. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

The production preferably takes place by the interfacial polycondensation process or the melt transesterification process and is firstly described using the example of the interfacial polycondensation process.

Compounds preferably to be used as starting compounds are bisphenols of the general formula HO—Z—OH, wherein Z is a divalent organic residue with 6 to 30 carbon atoms, which contains one or more aromatic groups. Examples of these compounds are bisphenols, which belong to the group of the dihydroxydiphenyls, bis(hydroxyphenyl) alkanes, indane bisphenols, bis(hydroxyphenyl) ethers, bis(hydroxyphenyl) sulfones, bis(hydroxyphenyl) ketones and α,α'-bis(hydroxyphenyl) diisopropylbenzenes.

Particularly preferred bisphenols that belong to the above groups of compounds are bisphenol A, tetraalkyl bisphenol A, 4,4-(metaphenylene diisopropyl) diphenol (bisphenol M), 4,4-(paraphenylene diisopropyl) diphenol, N-phenylisatin bisphenol, 1,1-bis(4-hydroxyphenyl)-3,3,5-trimethylcyclohexane (BP-TMC), bisphenols of the type of the 2-hydrocarbyl-3,3-bis(4-hydroxyaryl) phthalimidines, in particular 2-phenyl-3,3-bis(4-hydroxyphenyl) phthalimidine, and optionally mixtures thereof. Particularly preferred are homopolycarbonates based on bisphenol A and copolycarbonates based on the monomers bisphenol A and 1,1-bis(4-hydroxyphenyl)-3,3,5-trimethylcyclohexane. The bisphenol compounds to be used according to the invention are reacted with carbonic acid compounds, in particular phosgene, or in the melt transesterification process diphenyl carbonate or dimethyl carbonate.

Polyester carbonates are obtained by reacting the already mentioned bisphenols, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenone dicarboxylic acids. A part, up to 80 mole % and preferably from 20 to 50 mole %, of the carbonate groups in the polycarbonates can be replaced by aromatic dicarboxylic acid ester groups.

Inert organic solvents used in the interfacial polycondensation process are, for example, dichloromethane, the various dichloroethanes and chloropropane compounds, tetrachloromethane, trichloromethane, chlorobenzene and chlorotoluene. Chlorobenzene or dichloromethane, or mixtures of dichloromethane and chlorobenzene, are preferably used.

The interfacial polycondensation reaction can be accelerated by catalysts such as tertiary amines, in particular N-alkyl piperidines or onium salts. Tributylamine, triethylamine and N-ethyl piperidine are preferably used. In the case of the melt transesterification process, the catalysts mentioned in DE-A 42 38 123 are used.

The polycarbonates can be branched in a deliberate and controlled manner by using small amounts of branching agents. Some suitable branching agents are: isatinbiscresol, phloroglucinol, 4,6-dimethyl-2,4,6-tri-(4-hydroxyphenyl)-heptene-2; 4,6-dimethyl-2,4,6-tri-(4-hydroxyphenyl)heptane; 1,3,5-tri-(4-hydroxyphenyl)benzene; 1,1,1-tri-(4-hydroxyphenyl)ethane; tri-(4-hydroxyphenyl) phenylmethane; 2,2-bis[4,4-bis(4-hydroxyphenyl)cyclohexyl]propane; 2,4-bis(4-hydroxyphenylisopropyl)phenol; 2,6-bis(2-hydroxy-5'-methylbenzyl)-4-methylphenol; 2-(4-hydroxyphenyl)-2-(2,4-dihydroxyphenyl)propane; hexa-(4-(4-hydroxyphenylisopropyl)phenyl) orthoterephthalate; tetra(4-hydroxyphenyl)methane; tetra-(4-(4-hydroxyphenylisopropyl)phenoxy)methane; α, α', α''-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4''-dihydroxytriphenyl)methyl)benzene and in particular: 1,1,1-tri-(4-hydroxyphenyl)ethane and bis(3-methyl-4-hydroxyphenyl)-2-oxo-2,3-dihydroindole.

The 0.05 to 2 mole %, based on diphenols used, of branching agents or mixtures of branching agents that can optionally be incorporated, can be used together with the diphenols but can also be added at a later stage of the synthesis.

Chain terminators can be used. As chain terminators it is preferable to use phenols such as phenol, alkyl phenols such as cresol and 4-tert.-butylphenol, chlorophenol, bromophenol, cumyl phenol or mixtures thereof in amounts of 1-20 mole %, preferably 2-10 mole %, per mole of bisphenol. Phenol, 4-tert.-butylphenol and cumyl phenol are preferred.

Chain terminators and branching agents can be added to the syntheses separately or else together with the bisphenol.

The preferred polycarbonate according to the invention is bisphenol A homopolycarbonate.

Alternatively, the polycarbonates according to the invention can also be produced by the melt transesterification process. The melt transesterification process is described, for example, in the Encyclopedia of Polymer Science, Vol. 10 (1969), Chemistry and Physics of Polycarbonates, Polymer Reviews, H. Schnell, Vol. 9, John Wiley and Sons, Inc. (1964) and in DE-C 10 31 512.

In the melt transesterification process, the aromatic dihydroxy compounds already described for the interfacial polycondensation process are transesterified in the melt with carbonic acid diesters with the aid of suitable catalysts and optionally other additives.

Carbonic acid diesters within the meaning of the invention are those of formulae (4) and (5)

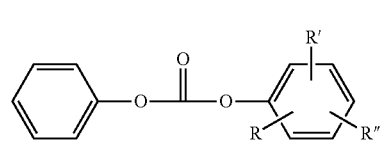

Formula (4)

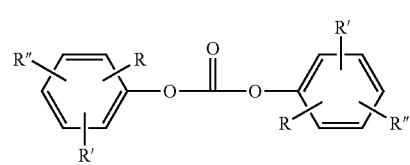

Formula (5)

wherein
R, R' and R'', independently of one another, can represent H, optionally branched $C_1$-$C_{34}$ alkyl/cycloalkyl, $C_7$-$C_{34}$ alkaryl or $C_6$-$C_{34}$ aryl, for example,
diphenyl carbonate, butyl phenyl phenyl carbonate, dibutyl phenyl carbonate, isobutyl phenyl phenyl carbonate, diisobutyl phenyl carbonate, tert-butyl phenyl phenyl carbonate, di-tert-butyl phenyl carbonate, n-pentyl phenyl phenyl carbonate, di(n-pentyl phenyl) carbonate, n-hexyl phenyl phenyl carbonate, di(n-hexyl phenyl) carbonate, cyclohexyl phenyl phenyl carbonate, dicyclohexyl phenyl carbonate, phenyl phenol phenyl carbonate, diphenyl phenol carbonate, isooctyl phenyl phenyl carbonate, diisooctyl phenyl carbonate, n-nonyl phenyl phenyl carbonate, di(n-nonyl phenyl) carbonate, cumyl phenyl phenyl carbonate, dicumyl phenyl carbonate, naphthyl phenyl phenyl carbonate, dinaphthyl phenyl carbonate, di-tert.-butyl phenyl phenyl carbonate, di-(di-tert.-butyl phenyl) carbonate, dicumyl phenyl phenyl carbonate, di-(dicumyl phenyl) carbonate, 4-phenoxyphenyl phenyl carbonate, di-(4-phenoxyphenyl) carbonate, 3-pentadecyl phenyl phenyl carbonate, di-(3-pentadecyl phenyl) carbonate, trityl phenyl phenyl carbonate, ditrityl phenyl carbonate, preferably
diphenyl carbonate, tert-butyl phenyl phenyl carbonate, di-tert.-butyl phenyl carbonate, phenyl phenol phenyl carbonate, diphenyl phenol carbonate, cumyl phenyl phenyl carbonate, dicumyl phenyl carbonate, particularly preferably diphenyl carbonate.

Mixtures of the above carbonic acid diesters can also be used.

The content of carbonic acid esters is 100 to 130 mole %, preferably 103 to 120 mole %, particularly preferably 103 to 109 mole %, based on the dihydroxy compound.

As catalysts within the meaning of the invention, basic catalysts as described in the melt transesterification process and in the above-mentioned literature, such as for example alkali and alkaline earth hydroxides and oxides, but also ammonium or phosphonium salts, referred to below as onium salts, are used. Onium salts, particularly preferably phosphonium salts, are preferably used in this case. Phosphonium salts within the meaning of the invention are those of formula (6)

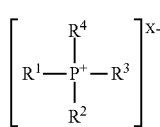

formula (6)

wherein
$R^{1-4}$ can be the same or different $C_1$-$C_{10}$ alkyls, $C_6$-$C_{10}$ aryls, $C_7$-$C_{10}$ aralkyls or $C_5$-$C_6$ cycloalkyls, preferably methyl or $C_6$-$C_{14}$ aryls, particularly preferably methyl or phenyl, and
$X^-$ is an anion, such as hydroxide, sulfate, hydrogen sulfate, hydrogen carbonate, carbonate, a halide, preferably chloride, or an alcoholate of the formula OR, wherein R can be $C_6$-$C_{14}$ aryl or $C_7$-$C_{12}$ aralkyl, preferably phenyl. Preferred catalysts are
tetraphenyl phosphonium chloride,
tetraphenyl phosphonium hydroxide,
tetraphenyl phosphonium phenolate,
particularly preferably tetraphenyl phosphonium phenolate.

The catalysts are used preferably in amounts of $10^{-8}$ to $10^{-3}$ mol, based on one mol of bisphenol, particularly preferably in amounts of $10^{-7}$ to $10^{-4}$ mol.

Other catalysts can be used alone or optionally in addition to the onium salt in order to increase the rate of polymerisation. These include salts of alkali metals and alkaline earth metals, such as hydroxides, alkoxides and aryl oxides of lithium, sodium and potassium, preferably hydroxide, alkoxide or aryl oxide salts of sodium. Most preferred are sodium hydroxide and sodium phenolate. The amounts of the cocatalyst can be in the range of 1 to 200 ppb, preferably 5 to 150 ppb and most preferably 10 to 125 ppb, calculated as sodium in each case.

The transesterification reaction of the aromatic dihydroxy compound and the carbonic acid diester in the melt is preferably performed in two steps. In the first step, the melting of the aromatic dihydroxy compound and the carbonic acid diester takes place at temperatures of 80 to 250° C., preferably 100 to 230° C., particularly preferably 120 to 190° C. under standard pressure in 0 to 5 hours, preferably 0.25 to 3 hours. After the addition of the catalyst, the oligocarbonate is produced from the aromatic dihydroxy compound and the carbonic acid diester by applying a vacuum (up to 2 mm Hg) and increasing the temperature (up to 260° C.) by distilling off the monophenol. The majority of the vapours from the process are formed here. The oligocarbonate thus produced has a weight average molecular weight $M_w$ (determined by measuring the relative solution viscosity in dichloromethane or in mixtures of equal amounts by weight of phenol/o-dichlorobenzene calibrated by light scattering) in the range of 2000 g/mol to 18 000 g/mol and preferably from 4 000 g/mol to 15 000 g/mol.

In the second step, during polycondensation, the polycarbonate is produced by further increasing the temperature to 250 to 320° C., preferably 270 to 295° C. and a pressure of <2 mm Hg. In this step, the remainder of vapours are removed from the process.

The catalysts can also be used in combination (two or more) with one another.

When alkali/alkaline earth metal catalysts are used, it may be advantageous to add the alkali/alkaline earth metal catalysts at a later point in time (e.g. after the oligocarbonate synthesis during the polycondensation in the second step).

The reaction of the aromatic dihydroxy compound and the carbonic acid diester to form the polycarbonate can be performed batchwise, or preferably continuously, within the meaning of the process according to the invention, for example in stirred vessels, thin layer evaporators, falling film evaporators, stirred vessel cascades, extruders, kneaders, simple disc reactors and high-viscosity disc reactors.

As in the interfacial polycondensation process, branched poly- or copolycarbonates can be produced by using polyfunctional compounds.

The sheets according to the invention can consist of polycarbonates, copolycarbonates and thermoplastic polyester carbonates to which other plastics, such as polyamides, polyimides, polyester amides, polyacrylates and polymethacrylates, such as, for example, polyalkyl (meth)acrylates and here in particular polymethyl methacrylate, polyacetals, polyurethanes, polyolefins, halogen-containing polymers, polysulfones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or of alpha-methyl styrene with dienes or acrylic derivatives, graft polymers based on acrylonitrile/butadiene/styrene or graft copolymers based on acrylate rubber (cf. for example, the graft polymers described in EP-A 640 655) or silicone rubbers, are added in a known manner, for example by compounding. Sheets of the polycarbonates described above without any other polymer blend partners are preferably used.

The conventional additives for these thermoplastics, such as fillers, UV stabilisers, heat stabilisers, antistatic agents and pigments, can also be added to the polycarbonates according to the invention and the other plastics that are optionally contained, in the conventional quantities; the mould release properties, flow properties and/or the flame resistance may also optionally be improved by adding external mould release agents, free-flow agents and/or flame retardants (e.g. alkyl and aryl phosphites, phosphates, phosphanes, low-molecular-weight carboxylic acid esters, halogen compounds, salts, chalk, silica flour, glass and carbon fibres, pigments and combinations thereof). Compounds of this type are described e.g. in WO 99/55772 A, pp. 15-25, EP 1 308 084 and in the appropriate chapters of the "Plastics Additives Handbook", ed. Hans Zweifel, 5$^{th}$ Edition 2000, Hanser Publishers, Munich.

As described above, for reasons of cost the additional use of other flame retardants is not advantageous. The polycarbonate compositions of the sheets according to the invention can, however, also contain additional flame retardants which are listed below by way of examples:

flame retardants are, inter alia, alkali or alkaline earth salts of aliphatic or aromatic sulfonic acid, sulfonamide and sulfonimide derivatives e.g. sodium or potassium perfluorobutane sulfate, sodium or potassium perfluorooctane sulfate, sodium or potassium diphenyl sulfone sulfonate and sodium or potassium 2,4,6-trichlorobenzoate and N-(p-tolylsulfonyl)-p-toluene sulfimide potassium salt, N-(N'-benzylaminocarbonyl)sulfanylimide potassium salt. Potassium perfluorobutane sulfonate is commercially available as, inter alia, Bayowet®C4 (Lanxess, Leverkusen, Germany), RM64 (Miteni, Italy) or as 3M™ Perfluorobutanesulfonyl Fluoride FC-51 (3M, USA).

Halogen-containing flame retardants for use in polycarbonate sheets are e.g. brominated compounds such as brominated oligocarbonates are e.g. tetrabromobisphenol A oligocarbonate BC-52®, BC-58®, BC-52HP® from Chemtura. Polypentabromobenzyl acrylates (e.g. FR 1025 from Dead Sea Bromine (DSB)), oligomeric reaction products of tetrabromobisphenol A with epoxides (e.g.

FR 2300 and 2400 from DSB), or brominated oligo- or polystyrenes (e.g. PyroChek® 68PB from Ferro Corporation, PDBS 80 and Firemaster® PBS-64HW from Chemtura) should also be mentioned.

In addition, polytetrafluoroethylene (PTFE) can also be added to the moulding compositions as an anti-drip agent. This is commercially available in various product grades. These include additives such as Hostaflon® TF2021 or PTFE blends such as Metablen® A-3 800. However, these anti-drip agents lead to haze formation.

The compositions according to the invention preferably contain no anti-drip agents, however, and contain as flame retardants exclusively phosphorus compounds of general formula (1) (flame retardant 1).

As described above, the flameproofed sheets should be protected from UV light. One or more covering layers, e.g. paint layers or coextrusion layers, that contain UV absorbers can contribute to this.

The sheets within the meaning of the present invention preferably contain a covering layer containing UV absorbers. Moreover, the base layer can also contain UV absorbers. The covering layers can be applied on one or both sides.

The method of applying additional layers, e.g. of polycarbonate, to one or both surfaces of the upper or lower wall is sufficiently well known (cf. e.g. EP-A 368094, EP-A 372213, EP-A 0548822). The coating layer in this case can contain e.g. UV absorbers or pearlescent pigments and can be applied by the coextrusion method or by painting or reverse-roll coating.

The covering layer preferably contains one or more UV absorbers selected from the group containing the following substances: triazines, benzotriazoles, cyanoacrylates and bismalonates.

The covering layer most particularly preferably contains one or more UV absorbers selected from the following substances: 2-[2-hydroxy-4-(2-ethylhexyl)oxy]phenyl-4,6-di(4-phenyl)phenyl-1,3,5-triazine (CAS No. 204583-39-1); 2-(2H-benzotriazol-2-yl)-4-(1,1-dimethylethyl)-6-(1-methylpropyl)phenol (CAS No. 36437-37-3), which is commercially available with the name Tinuvin® 350 from Ciba; 2,2'-methylenebis[6-(2H-benzotriazol-2-yl)-4-(1,1,3,3-tetramethylbutyl)phenol (CAS No. 103597-45-1), which is commercially available with the name Tinuvin® 360 from Ciba or the name ADK Stab LA31® from Adeka-Palmarole; 2-(4,6-diphenyl-1,3,5-triazin-2-yl)-5-(hexyloxy)phenol (CAS No. 147315-50-2), which is commercially available with the name Tinuvin° 1577 from Ciba; 2-[4,6-bis(2,4-dimethylphenyl)-1,3,5-triazin-2-yl]-5-(octyloxy)phenol (CAS No. 2725-22-6), which is commercially available with the name Cyasorb° UV 1164 from Cytec Industries Inc.; ethyl-2-cyano-3,3-diphenyl acrylate (CAS No. 5232-99-5), which is commercially available with the name Uvinul® 3035 from BASF AG; 2-ethylhexyl-2-cyano-3,3-diphenyl acrylate (CAS No. 6197-30-4), which is commercially available with the name Uvinul® 3039 from BASF AG; 1,3-bis[(2'-cyano-3',3'-diphenylacryloyl)oxy]-2,2-bis{[(2'-cyano-3',3'-diphenylacryloyl)oxy]methyl}propane (CAS No. 178671-58-4), which is commercially available with the name Uvinul® 3030 from BASF AG; tetraethyl-2,2'-(1,4-phenylenedimethylidene) bismalonate (CAS No. 6337-43-5), which is commercially available with the name Hostavin® B-CAP™ XP3030 from Clariant GmbH.

The base layer of the sheets according to the invention contains either no UV absorbers or one or more UV absorbers selected from the following classes of substances: benzotriazoles, cyanoacrylates, bismalonates.

The base layer of the according to the invention preferably contains one or more UV absorbers, particularly preferably selected from the following substances: 2-(2H-benzotriazol-2-yl)-4-(1,1,3,3-tetramethylbutyl)phenol (CAS No. 3147-75-9), which is commercially available with the name Tinuvin® 329 from Ciba or with the name Uvinul® 3029 from BASF AG or with the name Cyasorb® UV 5411 from Cytec Industries Inc.; 2-(2H-benzotriazol-2-yl)-4,6-bis(1-methyl-1-phenylethyl)phenol (CAS No. 70321-86-7), which is commercially available with the name Tinuvin 234® from Ciba; 2-(5-chloro-2H-benzotriazol-2-yl)-6-(1,1-dimethylethyl)-4-methyl)phenol (CAS No. 3896-11-5), which is commercially available with the name Tinuvin® 326 from Ciba or with the name Uvinul® 3026 from BASF AG; 2,2'-methylenebis[6-(2H-benzotriazol-2-yl)-4-(1,1,3,3-tetramethylbutyl)phenol (CAS No. 103597-45-1), which is commercially available with the name Tinuvin® 360 from Ciba or the name ADK Stab LA31® from Adeka-Palmarole; ethyl-2-cyano-3,3-diphenyl acrylate (CAS No. 5232-99-5), which is commercially available with the name Uvinul® 3035 from BASF AG; 2-ethylhexyl-2-cyano-3,3-diphenyl acrylate (CAS No. 6197-30-4), which is commercially available with the name Uvinul® 3039 from BASF AG; 1,3-bis[(2'-cyano-3',3'-diphenylacryloyl)oxy]-2,2-bis{[(2'-cyano-3',3'-diphenylacryloyl)oxy]methyl}propane (CAS No. 178671-58-4), which is commercially available with the name Uvinul® 3030 from BASF AG; tetraethyl-2,2'-(1,4-phenylenedimethylidene) bismalonate (CAS No. 6337-43-5), which is commercially available with the name Hostavin® B-CAP™ XP3030 from Clariant GmbH.

The proportion by weight of the UV absorber in the covering layer is 0.50 wt. %-11.00 wt. %, preferably 1.00 wt. %-3.00 wt. % and in a special embodiment 4.00 wt. %-8.00 wt. %, based on the overall composition of the covering layer. In the case of mixtures of UV absorbers, the statement of weight relates to the sum of all of the UV absorbers used. Where a UV absorber is used in the base layer, the proportion by weight is 0.01 wt. %-1.00 wt. %, preferably 0.10 wt. %-0.50 wt .%, again based on the overall composition of the covering layer.

The incorporation of the additives into the composition containing polycarbonate takes place by common incorporation methods and can, for example, take place by mixing solutions of the additives and solution of polycarbonate in suitable solvents, such as dichloromethane, haloalkanes, haloaromatics, chlorobenzene and xylenes. The mixtures of substances are then preferably homogenised in a known manner by extrusion. The solution mixtures are preferably worked up in a known manner by evaporation of the solvent and subsequent extrusion.

In addition, the composition can be mixed in conventional mixing equipment, such as screw extruders (for example a twin screw extruder, ZSK), kneaders, Brabender or Banbury mills and then extruded. After extrusion, the extrudate can be cooled and pelletised. Individual components can also be pre-mixed and then the remaining starting substances added individually and/or likewise mixed.

The additives, in particular flame retardant additives and/or UV absorbers, can also be added to the starting materials for the sheets by means of concentrates (masterbatches). In this case, the additive or additives are incorporated into the polycarbonate in the highest possible concentration by one of the methods of incorporation described above. The additive concentrate is then mixed into the polycarbonate granules for sheet production in such a way that the desired final concentration of the additive is obtained.

The sheets comprising a base layer and optional covering layer/layers are preferably produced by (co)extrusion.

For the purpose of extrusion, the thermoplastic granules, which have optionally been pretreated e.g. by drying, are fed into the extruder and melted in the extruder's plasticising system. The polymer melt is then pressed through a slit die or a multi-wall sheet die, being shaped in the process, brought into the desired final shape in the nip of a polishing calender and fixed in shape by cooling on both sides on polishing rolls and by the ambient air. The temperatures necessary for extrusion of the polycarbonate are set, for which the manufacturer's instructions can usually be followed. The polycarbonates with a high melt viscosity used for the extrusion are generally processed e.g. at melt temperatures of 260 to 320° C., and the barrel temperatures of the plasticising barrel and die temperatures are adjusted accordingly.

By using one or more side extruders and a multi-channel die or optionally suitable melt adapters upstream of a slit die, thermoplastic melts of different compositions may be placed one on top of the other, thus producing multi-layer sheets or films (for co-extrusion, cf. e.g. EP-A 0 110 221, EP-A 0 110 238 and EP-A 0 716 919; for details of the adapter and die method, cf. Johannaber/Ast: "KunststoffMaschinenführer", Hanser Verlag, 2000 and in Gesellschaft Kunststofftechnik: "Coextrudierte Folien und Platten: Zukunftsperspektiven, Anforderungen, Anlagen und Herstellung, Qualitätssicherung", VDI-Verlag, 1990).

The sheets according to the invention can also contain other functional or decorative layers, for example produced by coextrusion or coating methods. Applications for the products are found in the sectors of architectural glazing, in particular roofing and glazing of swimming pools, car ports, greenhouses, industrial complexes and private buildings, as well as noise protection walls and screen walls.

BRIEF DESCRIPTION OF DRAWINGS

The foregoing brief description, as well as the following detailed description, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown. In the drawings:

FIG. 1 illustrates a multi-wall sheet additionally containing a coextrusion layer.

EXAMPLES

Polycarbonates and Additives Used
  Base Layer:
  Component A
  Makrolon 3103 550115 MAS157, a linear bisphenol A polycarbonate containing UV absorbers with a melt volume rate (MVR) of 6 cm$^3$/10 min (at 300° C. and 1.2 kg in accordance with ISO 1133) from Bayer MaterialScience AG
  Component B
  Makrolon® 1243 550111 MAS157, a branched bisphenol A polycarbonate containing UV absorbers with a melt volume rate (MVR) of 6 cm$^3$/10 min (at 300° C. and 1.2 kg in accordance with ISO 1133) from Bayer MaterialScience AG
  Flame Retardant Additives
  BDP: bisphenol A diphosphate from Chemtura (Indianapolis, USA) with the trade name Reofos® BAPP
  TBBOC: tetrabromobisphenol A oligocarbonate BC-52 from Chemtura
  Covering Layer:
  Makrolon® ET UV510 from Bayer MaterialScience AG (linear polycarbonate containing a triazine-based UV absorber)
Production of Polycarbonate Flame Retardant Additive Concentrates The apparatus for compounding of the concentrates containing 15% BDP or 30% TBBOC consists of:
  metering apparatus for the components
  a co-rotating twin-screw kneader (Clextral EV 32 HT 2-screw extruder with 9 housings)
  a perforated die for forming melt strands
  a water bath for cooling and solidifying the strands
  a granulator.

For the production of the concentrates containing 15.00 wt. % BDP or 30.00 wt. % TBBOC, the procedure was that the appropriate flame retardant was metered into the polycarbonate component A. The housing temperatures in the above-mentioned compounding extruder used in this case were: in zone 1 40° C., in zone 2 150° C. and in the following zones between 280 and 300° C. in each case. The throughput was between 50 and 75 kg/h. The melt temperature was between 310° and 340° C.

Examples 1-10

Production of the Polycarbonate Three-Wall Sheets

The coextruded polycarbonate multi-wall sheets were produced with the aid of the following machinery and equipment:
  a single-screw extruder (vented extruder, screw diameter 70 mm and a single screw with a length of 33 D, single screw, Reifenhäuser, Troisdorf/Germany)
  The extruder is fitted with a vacuum melt degassing facility.
  a 2-layer coextrusion adapter (fixed adapter from Bexsol, Italy)
  a 3-zone coextruder (screw diameter 30 mm, single screw with a length of 25 D, Omipa, Italy)
  a multi-wall sheet die with a width of 500 mm for multi-wall sheet thicknesses of 8 to 45 mm from Bexsol, Italy
  a two-part vacuum calibrator, width 500 mm, length 2×950 mm, Breyer, Singen/Germany
  the roller conveyor, roller conveyor length (calibrator/cutter distance) 3.5 m
  the take-off device
  the transverse cutter (knife)
  the stacking table.

The multi-wall sheet which is provided on one side with a coextrusion layer was produced as follows: by means of feed carriages, a dry mixture of components A, B and the flame retardant concentrate (either BPD or TBBOC) was continuously produced during extrusion, which acts as material for the base layer for sheet production. These polycarbonate granules of the base material were fed into the feed hopper of the main extruder. The flame retardant concentrates were metered by the weigh feeder in such a way that the final concentration of flame retardants resulted in the sheet as specified in examples 1-10 (cf. also column 2 in Table 1). The granule mixture was melted in the main extruder consisting of barrel/screw, and conveyed. The temperatures of the individual housings of the main extruder were 240° to 260° C., and the resulting melt temperature was 250-255° C. The screw speed was 67 rpm. The coextrusion material used in all of the examples 1-10, Makrolon ET UV510 from Bayer MaterialScience AG for the covering layer for one side of the sheet, was fed into the feed hopper of the coextruder. The housing temperatures of the coextruder were 265° C., the melt temperature approx. 263° C. The screw speed was 12 rpm.

The two material melts were brought together in the coex adapter and then shaped in the die to form a three-wall sheet with a 3X profile and a thickness of 25 mm. The thickness c of the coex layer was 50 µm. The take-off speed was 1.1 m/min. The remainder of the devices in the equipment were used for the transport, cutting and stacking of the coextruded sheets.

Multi-Wall Sheet Geometry:

The measurement of the sheets obtained in accordance with the conditions described above gave a thickness d=25 mm and a spacing between the parallel ribs(s) of 25 mm. All of the sheets have a weight per unit area of about 3.5 kg/m².

The following examples describe sheets in the profile described above containing the one coextrusion layer of Makrolon® ET UV 510. Only the formulations of the base layer are given below.

The following % data refer to percent by weight (wt. %).

Example 1

Comparison

Three-wall sheet, produced as stated above, base layer consisting of 50.00 wt. % component A and 50.00 wt. % component B, no flame retardant is used; coextrusion layer consisting of Makrolon® ET UV 510.

Example 2

Comparison

Three-wall sheet, produced as stated above, base layer consisting of a mixture of 49.50 wt. % component A and 49.50 wt. % component B with 1.00 wt. % of a masterbatch of polycarbonate of component A containing 30.00 wt. % TBBOC. The total proportion of TBBOC in this mixture is therefore 0.30 wt. %; coextrusion layer consisting of Makrolon® ET UV 510.

Example 3

Comparison

Three-wall sheet, produced as stated above, base layer consisting of a mixture of 47.50 wt. % component A and 47.50 wt. % component B with 5.00 wt. % of a masterbatch of polycarbonate of component A containing 30.00 wt. % TBBOC. The total proportion of TBBOC in this mixture is therefore 1.50 wt. %; coextrusion layer consisting of Makrolon® ET UV 510.

Example 4

Comparison

Three-wall sheet, produced as stated above, base layer consisting of a mixture of 45.00 wt. % component A and 45.00 wt. % component B with 10.00 wt. % of a masterbatch of polycarbonate of component A containing 30.00 wt. % TBBOC. The total proportion of TBBOC in this mixture is 3.00 wt. %; coextrusion layer consisting of Makrolon® ET UV 510.

Example 5

Comparison

Three-wall sheet, produced as stated above, base layer consisting of a mixture of 40.00 wt. % component A and 40.00 wt. % component B with 20.00 wt. % of a masterbatch of polycarbonate of component A containing 30.00 wt. % TBBOC. The total proportion of TBBOC in this mixture is 6%; coextrusion layer consisting of Makrolon® ET UV 510.

Example 6

According to the Invention

Three-wall sheet, produced as stated above, base layer consisting of a mixture of 49.50 wt. % component A and 49.50 wt. % component B with 1.00 wt. % of a masterbatch of polycarbonate of component A containing 15.00 wt. % BDP. The total proportion of BDP in this mixture is 0.15 wt. %; coextrusion layer consisting of Makrolon® ET UV 510.

Example 7

According to the Invention

Three-wall sheet, produced as stated above, base layer consisting of a mixture of 47.50 wt. % component A and 47.50 wt. % component B with 5.00 wt. % of a masterbatch of polycarbonate of component A containing 15.00 wt .% BDP. The total proportion of BDP in this mixture is 0.75 wt. %; coextrusion layer consisting of Makrolon® ET UV 510.

Example 8

According to the Invention

Three-wall sheet, produced as stated above, base layer consisting of a mixture of 45.00 wt. % component A and 45.00 wt. % component B with 10.00 wt. % of a masterbatch of polycarbonate of component A containing 15.00 wt. % BDP. The total proportion of BDP in this mixture is 1.50 wt. %; coextrusion layer consisting of Makrolon® ET UV 510.

Example 9

According to the Invention

Three-wall sheet, produced as stated above, base layer consisting of a mixture of 40.00 wt. % component A and 40.00 wt. % component B with 20.00 wt. % of a masterbatch of polycarbonate of component A containing 15.00 wt. % BDP. The total proportion of BDP in this mixture is 3.00 wt. %; coextrusion layer consisting of Makrolon® ET UV 510.

Example 10

Comparative Example

Three-wall sheet, produced as stated above, base layer consisting of a mixture of 25.00 wt. % component A and 25.00 wt. % component B with 50.00 wt. % of a masterbatch of polycarbonate of component A containing 15.00 wt. % BDP. The total proportion of BDP in this mixture is 7.50 wt. %; coextrusion layer consisting of Makrolon® ET UV 510.

Tests a) Outdoor Weathering

The polycarbonate sheets were subjected to outdoor weathering. The weathering was carried out by Atlas Material Testing Technology GmbH. The weathering location was Hoek van Holland (Netherlands). During the test, the sheets were oriented at a 45° angle facing south. Direct weathering took place, i.e. with no additional pane in front of them. The samples had no black panel or mirror placed behind them.

Before the fire test, the sheets were conditioned for at least 48 h at 23° C. and 50% relative humidity.

The weathering period was 1 year (September 2007 to September 2008).

b) Rheological Properties

The determination of the melt flow index (MFR, MVR) took place based on ISO 1133 or according to ASTM D1238 MVR.

c) Flame Retardancy Tests

The fire shaft test according to DIN 4102 provides for the following conditions: 4 samples measuring 19 cm×100 cm×original thickness are arranged vertically and at right angles to one another.

After 10-minutes' exposure to flames from a ring burner, the burner is switched off The fire shaft test is considered to have been passed if—the average value of the residual lengths that have not been destroyed is at least 150 mm and none of the samples has burned away completely (residual length 0 mm),—the average flue gas temperature does not exceed 200° C.

Before the test, the mouldings were stored in a standard conditioning atmosphere until they reached constant weight.

All of the fire tests were performed in the certified fire testing facility of Currenta GmbH & Co. OHG, Leverkusen according to DIN 4102.

As a flame retardant test, the fire shaft test described above was performed on the sheets based on Examples 1-10 (used as base material). The results are listed in Table 1 below. The fire shaft test was repeated after one year's outdoor weathering. The outdoor weathering was carried out as described above.

As can be seen from Table 1, only the multi-wall sheets according to the invention pass the relevant flame retardancy tests after weathering. Surprisingly, however, the other sheets, even with high concentrations of the flame retardant, do not pass the relevant flame retardancy tests after weathering.

The invention claimed is:

1. A sheet comprising a base layer comprising polycarbonate and 0.15 to 3 wt. % of a flame retardant, wherein the flame retardant comprises at least one phosphorus compound of formula 1

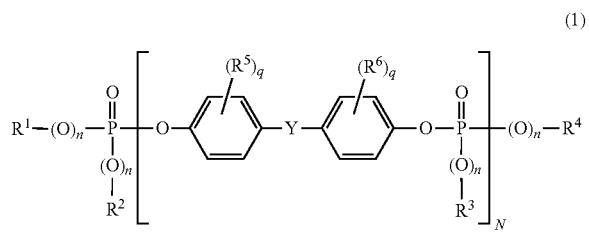

(1)

wherein $R^1$, $R^2$, $R^3$ and $R^4$ are phenyl, n independently of one another represents 0 or 1, q independently of one another represents 0, 1, 2, 3 or 4, and N is 0.60 to 4.00, $R^5$ and $R^6$, independently of one another, represents a $C_1$-$C_4$ alkyl, and Y represents a $C_1$-$C_7$ alkylidene, $C_1$-$C_7$ alkylene, $C_5$-$C_{12}$ cycloalkylene, $C_5$-$C_{12}$ cycloalkylidene, —O—, —S—, —SO—, —SO$_2$—, —CO— or a residue of formula (2) or (3)

(2)

TABLE 1

| Example | Content of flame retardant additive in base layer [%] | Fire shaft test | | | Fire shaft test after 1 year's weathering | | |
|---|---|---|---|---|---|---|---|
| | | DIN 4102-B1 | Max. average flue gas temperature [° C.] | Average residual length not destroyed [cm] | DIN 4102-B1 | Max. average flue gas temperature [° C.] | Average residual length not destroyed [cm] |
| 1 | 0 | Passed | 113 | 51 | Failed | 250 | — |
| 2 | 0.3% TBBOC | Passed | 119 | 34.7 | Failed | 310 | — |
| 3 | 1.5% TBBOC | Passed | 119 | 41 | Failed | 257 | — |
| 4 | 3% TBBOC | Passed | 113 | 47 | Failed | 294 | — |
| 5 | 6% TBBOC | Passed | 112 | 51 | Failed | 235 | — |
| 6 | 0.15% BDP | Passed | 108 | 50 | Passed | 158 | 45 |
| 7 | 0.75% BDP | Passed | 121 | 48 | Passed | 150 | 42 |
| 8 | 1.5% BDP | Passed | 119 | 51 | Passed | 137 | 44 |
| 9 | 3% BDP | Passed | 117 | 47 | Passed | 133 | 43 |
| 10 | 7.5% BDP | Passed | 116 | 46 | Failed | 115 | — |

-continued $$\begin{array}{c}\text{CH}_3\\|\\-\text{C}-\\|\\\text{CH}_3\end{array}\begin{array}{c}\\\\\text{C}_6\text{H}_4\\\\\end{array}\begin{array}{c}\text{CH}_3\\|\\\text{C}-\\|\\\text{CH}_3\end{array} \quad (3)$$

wherein

Z represents carbon and $R^{21}$ and $R^{22}$ can be selected for each Z individually and, independently of one another, represent hydrogen or C1-C6 alkyl, m represents an integer from 4 to 7, with the proviso that, on at least one Z atom, $R^{21}$ and $R^{22}$ are simultaneously alkyl and wherein the polycarbonate comprises a mixture of linear and branched polycarbonate and wherein the linear polycarbonate content is at least 40 wt. %, based on the total polycarbonate weight and the composition contains no anti-dripping agent and contains as flame retardants exclusively phosphorous compounds of general formula (1) and the sheet after one year of outdoor weathering meets the fire classification B1 according to DIN 4102 B1.

2. The sheet according to claim 1, wherein the at least one phosphorus compound comprises a bisphenol A diphosphate.

3. An architectural glazing in roofing or a glazing for swimming pools, carports, greenhouses, industrial complexes or private buildings, or as a noise protection wall or screen wall comprising the sheet according to claim 1.

4. The sheet according to claim 1, wherein $R^5$ and $R^6$, independently of one another, represents methyl and/or a halogen.

5. The sheet according to claim 1, wherein the halogen comprises chlorine and/or bromine.

6. The sheet according to claim 1, wherein $R^{21}$ and $R^{22}$ can be selected for each Z individually and, independently of one another, represent hydrogen, methyl and/or ethyl.

7. The sheet according to claim 1, wherein m represents an integer from 4 to 5.

8. The sheet according to claim 1, wherein N is 0.90 to 2.50.

9. The sheet according to claim 1, wherein N is 1.00 to 1.15.

10. The sheet according to claim 1, wherein the polycarbonate comprises homopolycarbonates, copolycarbonates and/or thermoplastic polyester carbonates.

11. The sheet according to claim 10, wherein the sheet is additionally coated on one or both sides with at least one coextrusion layer comprising a UV absorber and $R^5$ and $R^6$, independently of one another, represent methyl and/or a halogen, $R^{21}$ and $R^{22}$ can be selected for each Z individually and, independently of one another, represent hydrogen, methyl and/or ethyl, m represents an integer from 4 to 5 and N is 1.00 to 1.15.

12. The sheet according to claim 11, wherein the base layer consists essentially of at least 40 wt. % of the linear polycarbonate, at least 40 wt. % of a branched polycarbonate, 0.15-5 wt. % of a flame retardant and wherein the linear polycarbonate is present in the sheet in a higher amount than the branched polycarbonate.

13. The sheet according to claim 1, wherein the sheet is additionally coated on one or both sides with at least one coextrusion layer comprising a UV absorber.

14. The sheet according to claim 13, wherein the UV absorber comprises triazines, benzotriazoles, cyanoacrylates and/or bismalonates and the base layer comprises no UV absorbers or one or more UV absorbers selected from the group consisting of benzotriazoles, cyanoacrylates and bismalonates.

15. The sheet according to claim 1, wherein the sheet is a multi-wall sheet.

16. The sheet according to claim 15, wherein the weight per unit area of the multi-wall sheet is greater than 2.4 kg/m$^2$.

17. The sheet according to claim 15, wherein the sheet is a multi-wall sheet of the following geometry:

a. a 3-wall sheet with a thickness of 12 to 20 mm and a rib spacing of 12 to 20 mm, b. a 6-wall sheet with a thickness of 12 to 22 mm and a rib spacing of 12 to 22 mm, c. a 3-wall sheet with an X profile and a thickness of 12 to 20 mm wherein the X structure has a width of 20 to 30 mm, which is made up of 3 ribs, d. a 5-wall sheet with an X profile and a thickness of 20 to 50 mm wherein the X structure has a width of 20 to 30 mm, which is made up of 3 ribs, or e. a 5-wall sheet with an M profile and a thickness of 20 to 50 mm and the ribs have a spacing of 15 to 25 mm.

18. A sheet consisting essentially of a base layer consisting essentially of polycarbonate and 0.05-6 wt. % of a flame retardant, wherein the flame retardant comprises at least one phosphorus compound of formula 1

$$R^1-(O)_n-\overset{\overset{O}{\|}}{\underset{\underset{R^2}{|}}{\underset{(O)_n}{P}}}-\left[O-\underset{(R^5)_q}{\text{C}_6\text{H}_4}-Y-\underset{(R^6)_q}{\text{C}_6\text{H}_4}-O-\overset{\overset{O}{\|}}{\underset{\underset{R^3}{|}}{\underset{(O)_n}{P}}}\right]_N-(O)_n-R^4 \quad (1)$$

wherein $R^1$, $R^2$, $R^3$ and $R^4$ are phenyl, n independently of one another represents 0 or 1, q independently of one another represents 0, 1, 2, 3 or 4, and N is 0.60 to 4.00, $R^5$ and $R^6$, independently of one another, represents a $C_1$-$C_4$ alkyl, and Y represents a $C_1$-$C_7$ alkylidene, $C_1$-$C_7$ alkylene, $C_5$-$C_{12}$cycloalkylidene, —O—, —S—, —SO—, —SO$_2$—, —CO— or a residue of formula (2) or (3)

$$\begin{array}{c}-\text{C}^1-\\(\ )\\(Z)_m\\/\quad\backslash\\R^{21}\quad R^{22}\end{array} \quad (2)$$

-continued

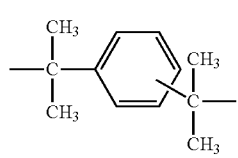

(3)

wherein
- Z represents carbon and
- $R^{21}$ and $R^{22}$ can be selected for each Z individually and, independently of one another, represent hydrogen or C1-C6 alkyl,
- m represents an integer from 4 to 7,
- with the proviso that, on at least one Z atom, $R^{21}$ and $R^{22}$ are simultaneously alkyl and wherein the polycarbonate consists essentially of a mixture of linear and branched polycarbonate and wherein the linear polycarbonate content is at least 40 wt. %, based on the total polycarbonate weight and the composition contains no anti-dripping agent and contains as flame retardants exclusively phosphorous compounds of general formula (1) and the sheet after one year of outdoor weathering meets the fire classification B1 according to DIN 4102 B1.

* * * * *